Patented Mar. 14, 1939

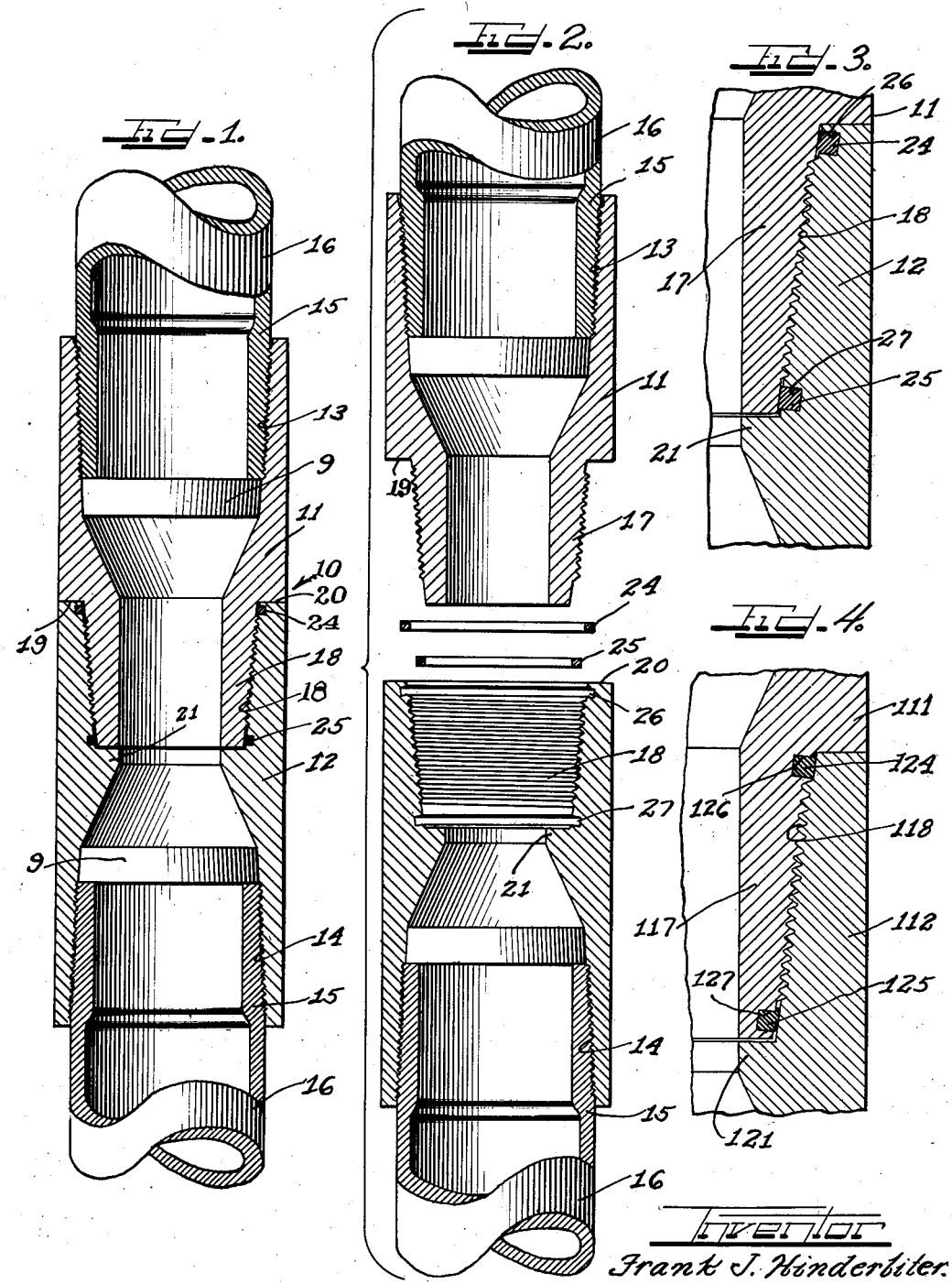

2,150,221

UNITED STATES PATENT OFFICE 2,150,221

ROTARY TOOL JOINT

Frank J. Hinderliter, Tulsa, Okla.

Application July 15, 1935, Serial No. 31,324

1 Claim. (Cl. 285—157)

My present invention relates to a rotary tool joint for use with drill pipe, and more particularly to a sealed tool joint of the type disclosed in my Patent Re. 19,196, granted June 5, 1934.

An object of this invention is to provide a rotary tool joint with novelly arranged sealing means between the pin and box members for effectively sealing the threaded portions of these members against leakage of mud-laden fluid therebetween.

Another object of the invention relates to providing a rotary tool joint with spaced sealing means positioned in the threaded socket of the box member for sealing cooperation with the threaded shank of the pin member inserted in the socket.

In accordance with the general features of this invention, there is provided a rotary tool joint including a box member having a tapered socket cooperable with a tapered threaded shank of a pin member, which members have a plurality of spaced rubber rings between the shank and socket, one being disposed adjacent the upper end of the socket, and the other being disposed adjacent the bottom of the socket, these rings projecting partially into the socket so as to be pressed into sealing engagement by the pin member as the shank is threaded into the socket.

In accordance with one form of the invention, the spaced rings are disposed in grooves in the wall of the box member defining the socket, and in another form of the invention the spaced rings are disposed in grooves formed in the shank of the pin member.

Other objects and features of this invention will more fully appear from the following detailed description taken in connection with the accompanying drawing, which illustrates several embodiments thereof, and in which:

Figure 1 is a fragmentary sectional view through a tool joint embodying the features of this invention, and showing the tool joint as connecting a pair of drill pipes;

Figure 2 is a sectional view similar to Figure 1, but illustrating the pin and box members as being separated, with the rubber rings positioned above the socket ready to be inserted therein;

Figure 3 is an enlarged fragmentary sectional view corresponding to a portion of Figure 1, showing the manner in which the spaced rubber sealing rings are pressed into tight sealing engagement with the threaded shank of the pin member and the wall of the socket of the box member; and Figure 4 is a sectional view similar to Figure 3, illustrating a modification of the invention in which the spaced rings are disposed in grooves formed in the threaded shank of the pin member.

The reference character 10 designates generally a rotary tool joint which embodies the usual pin member 11 and box member 12. This joint, as I have pointed out hereinabove, is of the same type as that disclosed in my issued Patent Re. 19,196.

The two members 11 and 12 each have a threaded pipe socket 13—14, in which is screwed an upset end 15 of a conventional drill pipe 16. In each socket there is a rubber sealing ring 9 such as is disclosed in my aforesaid patent.

The pin member has a tapered threaded shank 17 adapted to be screwed into a tapered threaded socket 18 in the box member 12. The threaded shank 17 terminates at its upper end in a shoulder 19 adapted to bear against a shoulder 20 at the outer end of the socket 18 of the box member. The inner end of the threaded shank 17, when the shank is in the socket, is disposed adjacent a flanged shoulder 21 formed on the inside wall of the box member 12.

Now, in order to prevent the escape of mud-laden fluid between the threads of the shank 17 and the socket 18, I propose, in accordance with the features of this invention, to provide a plurality of spaced sealing elements or rings positioned for disposition between the shank 17 and the socket 18. These rings are designated in Figure 2 by the reference characters 24 and 25. Due to the fact that the socket 18 is tapered, it of course follows that the upper ring is of a larger diameter than the lower ring. The upper ring 24 is disposed adjacent the shoulder 20 on the box member, and the lower ring 25 is located adjacent the shoulder 21 on the inside of the box member.

These rings are retained in place in the socket 18 by means of upper and lower annular grooves 26 and 27 for accommodating the two rings 24 and 25 respectively. These rings may be made of any suitable resilient material, such for example as rubber, and are adapted to be flexed or snapped into their respective grooves. The rings 24 and 25 each have a square or polygonal cross section which is of a greater size than that of the corresponding grooves 26—27. The reason for this is so that each ring will partially project from the groove into the interior of the socket.

By the disposition of these rings at the upper and lower extremities of the cooperable threaded portions of the shank 17 and socket 18, I am enabled to provide an effective barrier against the seepage of mud-laden fluid between these threaded portions. Such mud-laden fluid, as is well known in this art, has an abrasive action, so that if the threads are subjected to such fluid, it does not take long for the fluid to eat away portions of the threads, and thus form a passage through which the fluid is short-circuited through the joint. I have found that by disposing spaced sealing means between the threaded shank and socket, I am enabled effectively to prevent such seepage of fluid from occurring. The rings 24 and 25, by reason of the fact that they are made of live rubber, will, when displaced as shown in Figure 3 by the insertion of the shank of the pin in the socket, be effectively urged into sealing engagement with the wall of the shank 17 and the walls of the grooves. These rings will respond to any play between the pin and socket members by continuing to exert a sealing pressure so as to seal off mud-laden fluid.

The joint is easily assembled by first disposing the rings 24 and 25 in the two grooves 26 and 27, and by thereafter screwing the shank 17 of the pin member into the socket 18 of the box member until the shoulders 19 and 20 are engaged. During this connecting operation, the rubber rings 24 and 25 are wedged or displaced into the tight sealing position previously referred to and as shown in Figure 3.

In Figure 4 I have illustrated a modification of the invention in which the pin member 111 has a threaded shank 117 screwed into the tapered socket 118 of the box member 112. The principal difference between this form of the invention and the previously described one resides in the fact that the rubber rings 124 and 125 are disposed in the grooves 126 and 127 in the threaded shank 117 instead of in grooves in the wall of the socket as shown in Figure 3. The spaced grooves are designated by the reference characters 126 and 127, the uppermost of which is disposed adjacent the upper end of the socket, and the lower one of which is disposed adjacent the central internal flange or shoulder 121 of the box member 112. With this exception, this form of the invention operates in the same manner as the previously described one.

In both forms of my invention, I contemplate that the rubber rings 24—25 or 124—125 may be reinforced by a suitable metal band or ring such as shown in my aforesaid Reissue Patent No. 19,196. This ring may be disposed in a suitable groove on the outer or inner peripheries of the rubber ring. The metallic ring would aid to hold the rubber ring in position in its groove in the tool joint part.

Now, I desire it understood that while I have illustrated and described in detail several forms of the invention, the invention is not to be thus limited, but only insofar as defined by the scope and spirit of the appended claim.

I claim as my invention:

A rotary tool joint including a box member having a tapered socket, a pin member having a tapered shank, the central portions of said socket and shank being formed into complementary threads for securing said members together and both end portions of both said socket and shank being formed into smooth conical surfaces, said conical surfaces being disposed so that one surface on one member and one surface on the other member cooperate to form a pair of opposed surfaces at one side of said threads and the other surfaces cooperate to form another pair on the other side of said threads, stop means on said members to prevent the movement of the shank into the socket beyond a point at which there is a small predetermined clearance between said conical surfaces, one of each of said pairs of conical surfaces being interrupted by an annular groove, and two rubber rings, one filling each of said grooves, said rings being thick enough to project above the adjacent conical surfaces a distance substantially greater than said clearance so that when said joint is assembled portions of said rubber rings are squeezed out between said surfaces into said clearance spaces.

FRANK J. HINDERLITER.